July 3, 1956     L. R. STONE     2,753,464
METHOD AND APPARATUS FOR INSPECTING TINPLATE
Filed Aug. 11, 1950     2 Sheets-Sheet 1
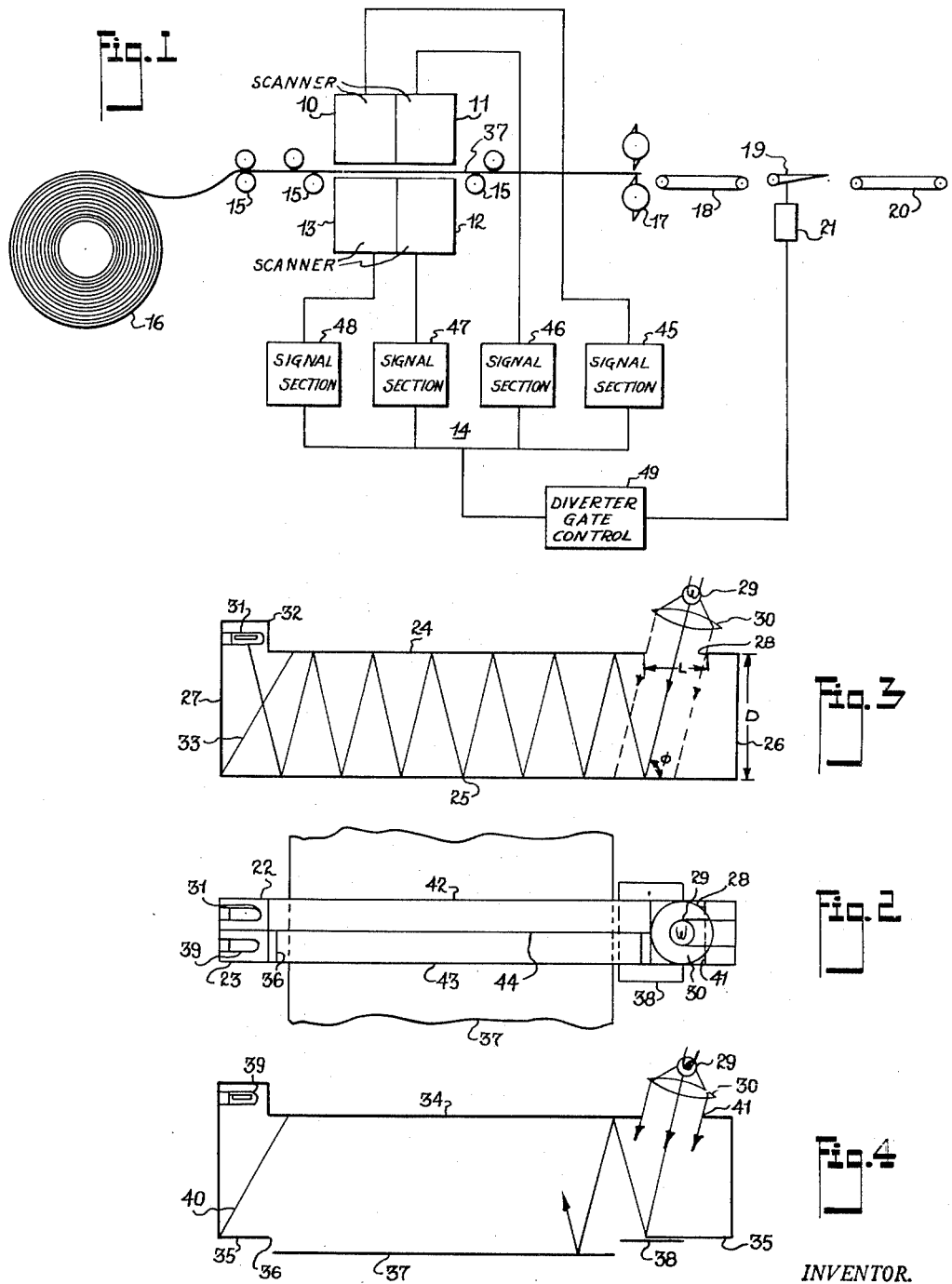
INVENTOR.
LEONARD R. STONE
BY
ATTORNEYS

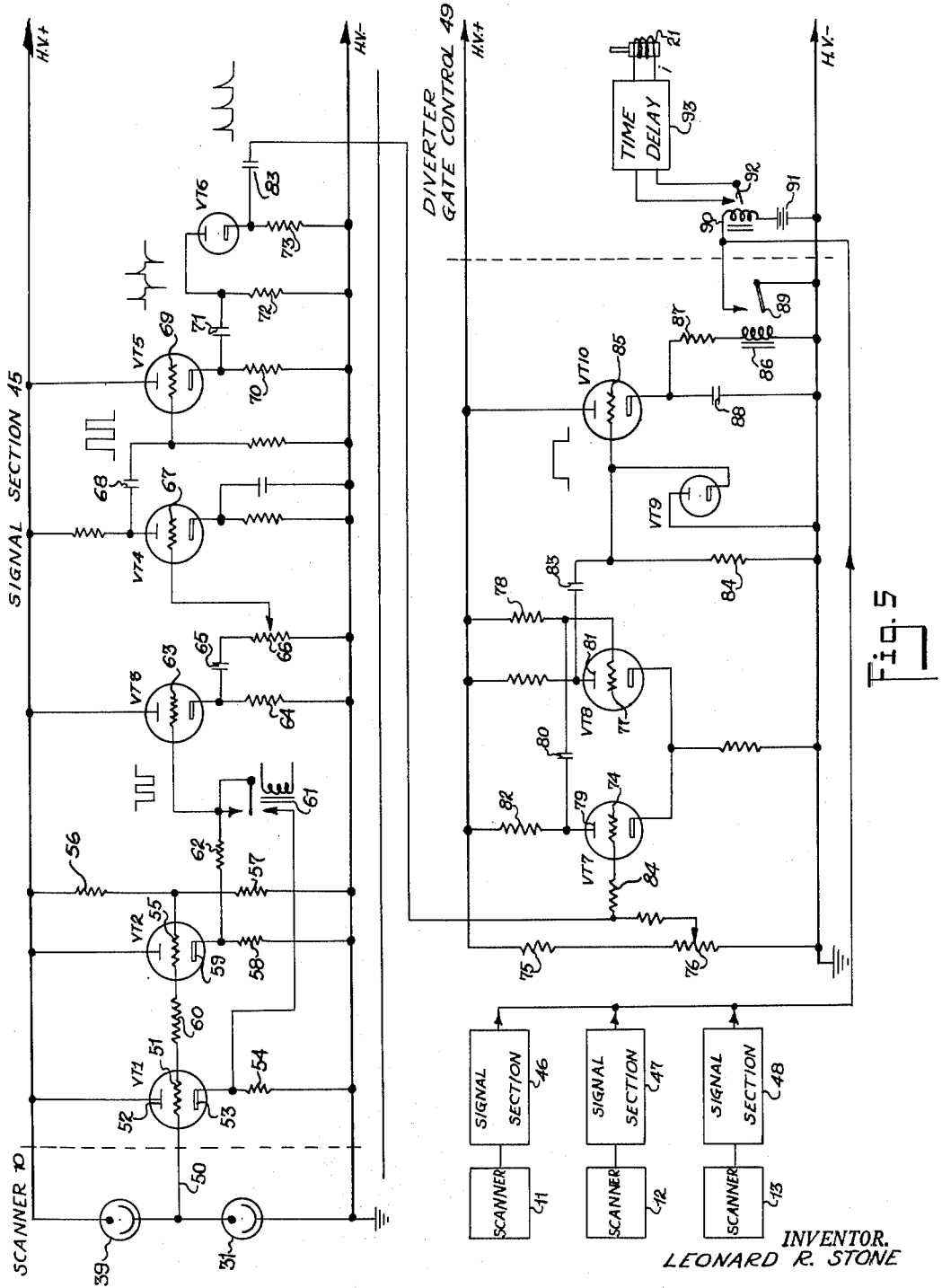

United States Patent Office 2,753,464
Patented July 3, 1956

2,753,464

METHOD AND APPARATUS FOR INSPECTING TINPLATE

Leonard R. Stone, Cleveland, Ohio, assignor to Republic Steel Corporation, Cleveland, Ohio, a corporation of New Jersey Application August 11, 1950, Serial No. 178,911

14 Claims. (Cl. 250—219)

This invention relates to the inspection and sorting of objects with respect to their light reflection characteristics, and more particularly to an apparatus for inspecting tin plate.

In the manufacture of tin plate, the presence of various imperfections in the surface of the strip or sheet necessitates some method of inspection prior to marketing. Manual inspection by visual methods has been customary, although such methods suffer from serious objections. Trained inspectors are required; the physical requirements of the inspection process necessitates frequent rest periods; and it is exceedingly difficult to obtain an adequate inspection of both sides of moving strip. In order to reduce the cost of inspection, various methods have been proposed for performing the inspection process automatically. These methods have involved the measurement of the normal reflectivity of the tin plate by the use of light sources and photo-electric cells, the output of the photocells being utilized to reject the defective sections of the plate. In principle, these latter methods present a satisfactory approach to the problem; practically, however, they suffer from the difficulty that each light-photocell combination can inspect only a small portion of the strip or sheet of tin plate. Thus, a number of units must be utilized with a corresponding increase in equipment requirements and a great multiplication of operational difficulties such as in balancing and calibrating the individual units and maintaining the requisite stability of operation.

The present invention is concerned with improved methods of and apparatus for automatically inspecting and sorting tin plate according to the reflectivity characteristics of the surfaces of the plate. As conceived and embodied herein, the invention includes a scanning device incorporating a light source and a photo-electric cell in an enclosure such that light is propagated from the source to the photocell by multiple reflection from parallel surfaces extending between the source and the cell. The strip to be inspected forms a portion of one of the reflecting surfaces and the angle of incidence and reflection between the light rays and the surfaces is such that the area encompassed by the light beam in one reflection is contiguous the area encompassed in the preceding reflection. Thus, the entire reflecting surface formed by the tin plate strip under inspection is traversed by the light and variations in the output of the photo-electric cell provide a measure of the imperfections in the surface of tin plate. One form of the scanner of the invention incorporates a standard in which the reflecting surfaces are uniform, thus providing a basis against which the variations of the light induced by the tin plate under inspection may be compared.

The novel inspection device includes novel circuit arrangements for transforming variations in scanner photoelectric cell output signals into suitable signals for the control of the tin plate rejection apparatus or gate. In the novel circuits, a differential detector is utilized to compare the two photo-electric cell output signals and generate a "square-wave" whose amplitudes correspond to the output of the respective photocells. This square wave is amplified, differentiated and clipped to produce a series of unidirectional impulses whose amplitude corresponds to the difference in amplitudes of the outputs of the scanner photoelectric cells. These impulses are then utilized to control a gating signal generator, in the form of a single impulse multivibrator, the action of the gating signal generator being determined by the amplitude of the unidirectional impulses.

An object of the invention is the provision of improved apparatus for inspecting tin plate.

An object of the invention is the provision of improved apparatus for determining the light reflectivity characteristics of sheet material.

An object of the invention is the provision of improved apparatus for automatically separating sheet articles according to the light reflectivity characteristics thereof.

An object of the invention is the improvement of the stability and reliability of photo-electric inspection devices for sheet material.

An object of the invention is the simplification of automatic sheet material inspectors.

These and other objects and features of the invention will be more readily apparent from a consideration of the following detailed specification and appended claims, taken in connection with the accompanying drawings, in which:

Fig. 1 is a diagrammatic representation of the tin plate inspection apparatus of the invention;

Figs. 2, 3 and 4 are diagrammatic representations of the scanner of the invention; and Fig. 5 is a diagram of the novel circuits of the invention.

Referring now to Fig. 1, the tin plate inspector comprises a series of scanners 10, 11, 12, and 13, electrical apparatus 14 and associated mechanical apparatus for passing the tin plate through the inspection zone and for separating the defective pieces from the flawless pieces. The mechanical apparatus includes a series of rolls 15 which receive the tin plate in strip form from a coil 16 and convey the strip past the scanners in spaced relation thereto and at a suitable speed. A rotary shear 17 serves to cut the strip into desired lengths. The lengths of strip are carried by a conveyor 18 to a diverter gate 19 and pass over the gate to a second conveyor 20 if without flaws. The presence of flaws in the surface of the tin strip is detected by the electrical apparatus 14 and a diverter gate solenoid 21 is activated after a suitable interval of time to deflect the gate 19. The lengths of strip containing the flaws are also deflected as they arrive at the diverter gate, which then returns to its normal position.

As shown in Fig. 2, each scanner of the invention is composed of two sections, a standard section 22 and an inspection section 23. The standard section 22 is illustrated in Fig. 3 and will serve also to illustrate the principles upon which the action of the scanner is based. As there shown, the scanner utilizes a multiple reflection principle in order the the entire width of the tin plate may be inspected by a single scanner.

The standard section 22 incorporates a top wall 24, a bottom wall 25, and end walls 26 and 27. The interior surfaces of the walls are polished or coated to form reflection surfaces having a high coefficient of normal reflectivity. An opening 28 in the upper wall 24 near one end of the scanner serves as an aperture for the admission of a beam of light formed by a light source 29 and a lens 30. This lens 30 serves to direct light from source 29 through the opening 28. At the remaining end of the scanner, a photo-electric cell 31 is mounted in an enclosure 32 while a suitable optical device 33 serves to direct rays of light reflected by the lower wall 25 upon the active element of the photo-electric cell. The scanner is, of course, impervious to light so that the only light admitted to the interior is that from the source 29.

The beam of light formed by the source 29 and lens 30 is propagated by multiple reflection between the upper and lower reflection surfaces formed by the walls 24 and 25 to the photo-electric cell 31. The path of propagation is such that the area encompassed by the beam at any reflection from a wall is immediately contiguous, or is slightly overlapped by the area of next reflection by that same wall. The light beam is thus successively reflected from every portion of the active parts of the reflecting surfaces and the total modification of the light beam is the sum of the modifications imposed at each reflection. This "scanning" action serves to provide a measure of the character of the entire surface of the reflecting areas. The relation between the length L of the aperture 23, the distance D between the walls 24 and 25, and the angle $\phi$ between the ray and the wall for contiguous reflection areas with no overlapping is expressible as follows:

$$\phi = \text{arc tan} \frac{2D}{L}$$

The inspection scanner section incorporates the principle just described with the surface of the sheet material to be inspected forming a portion of the lower reflecting surface. As shown in Fig. 4, the inspection scanner section includes a top wall 34 which serves as an upper reflection surface and a bottom wall 35 having a longitudinal opening 36 therein, so that the wall proper forms only a portion of the lower reflection surface. The sheet material to be inspected, in the present instance, the tin strip 37, is supported adjacent the opening 36 and parallel to the bottom wall 35. An adjusting plate 38 acts as an extension to the bottom wall 35 and as an adjustable barrier whereby the path of the light beam may be confined to the surface of the tin strip 37. The inspection scanner incorporates a photo-electric cell 39, optical device 40, and means for introducing a beam of light through an opening 41 in the top wall 34. As shown here, and illustrated particularly in Fig. 2, the light source 29 and lens 30 is common to both the standard and inspections sections of the scanner although such is not essential to the practice of the invention. The light is divided between the two scanner sections which are formed by side walls 42 and 43 and a dividing wall or partition 44 and a self-balancing action is obtained since variations of light intensity due to the source will affect both photo-electric cells equally.

In operation, the standard section of the scanner serves to determine a reference level of signal output voltage from the photo-electric cell 31, a level which is determined effectively by the light source 29. The signal output voltage of the inspection photo-electric cell 39 however, varies in accordance with the variations in surface reflectivity of the tin strip 37, as the tin strip is drawn past the scanner. These signal variations take place about the reference level determined by the source 29, so that a comparison of the outputs of the two photo-electric cells of the scanner provides a basis for the determination of the quality of the tin strip.

The electrical apparatus 14 of the invention serves to compare the signals generated by the photo-electric cells 31 and 39 of each of the scanners 10, 11, 12, and 13 and to generate suitable impulses for the actuation of the diverter gate in the presence of imperfections in the strip. As shown in Figs 1 and 5, each scanner has an associated signal circuit, the circuit 45 associated with the first scanner 10 being shown in detail while similar circuits 46, 47, and 48 are connected to scanners 11, 12, and 13. The four signal sections then jointly control the action of a diverter control circuit 49 and hence the diverter gate 19.

In the exemplary signal circuit, the photo-electric cells 31 and 39 are connected to a differential detector comprising tubes VT1 and VT2. The inspection cell 39 and the standard cell 31 are serially connected across a suitable source of anode potential (denoted as H. V.), effectively forming a voltage divider and having a common connection 50 joined to a control grid 51 of tube VT1. An anode 52 of tube VT1 is connected to the positive pole of the potential source and the cathode 53 is connected to the negative pole through a cathode coupling resistor 54. The variations in cathode potential of tube VT1 will thus correspond to the variations of intensity of light produced by the sheet material under inspection since the potential variations of the grid 51 are brought about by the difference of the variations due to the two cells. Any variation due to the scanner light source is automatically balanced out.

Tube VT2 is connected across the potential source and has a control grid 55 maintained at a fixed potential by a voltage divider comprising resistors 56 and 57. The voltage drop across the cathode coupling resistor 58 is thus constant and the potential of the cathode 59 fixed at a reference level. A common grid resistor 60 of relatively high resistance serves to provide a stabilizing action. The circuit arrangement of tubes VT1 and VT2 acts also to balance out any variations due to the anode potential source.

Cathodes 53 and 59 are connected through a vibrator 61 and an isolating resistor 62 to a grid 63 of tube VT3 which serves as a cathode follower to remove the high bias potential from the signal variations. The vibrator 61 is of a known type and switches the grid 63 from the one cathode to the other at a fixed rate. The signal applied to VT3 is thus a "square-wave" signal whose amplitudes correspond to the potentials of the cathodes 53 and 59 and whose repetition rate is determined by the vibrator. The switching rate actually used will be dependent upon the speed of the sheet material under inspection and the type of imperfection but in any event must be sufficient to provide an adequate sampling of the potential variations at the cathode 53.

The signal variations generated across the cathode resistor 64 are transmitted through a coupling condensor 65 and a potentiometer 66 to a control grid 67 of tube VT4. The time constant of the condenser 65 and potentiometer 66 is, of course, sufficiently large so that the signal waveform is not distorted. Tube VT4 is connected as an amplifier having a wide frequency response range and the amplified signal is transmitted through a coupling condenser 68 to a grid 69 of tube VT5 which serves as a cathode follower. The signal variations generated across a cathode coupling resistor 70 are impressed upon a differentiator comprising a condenser 71 and a resistor 72. The time constant of the condenser 71 and resistor 72 is such that the output signal consists of a series of sharp impulses, a positive impulse corresponding to the increase and a negative impulse to the decrease of the "square-wave" signal. The negative impulses are removed by a clipper comprising a diode rectifier tube VT6 and a cathode resistor 73 serially connected across the differentiator resistor 72. The signal generated across the cathode resistor 73 thus consists of a series of positive impulses, each of very short duration and of an amplitude corresponding to an instantaneous amplitude of the potential of the cathode 53.

Tubes VT7 and VT8 are connected into a single impulse multivibrator circuit which serves as a gating signal generator, that is, to generate a signal which actuates the diverter gate of Fig. 1. The multivibrator is of a type well known in the electrical art, the action being such that an exciting impulse causes the generation of an impulse whose duration is determined by certain circuit constants, and, upon completion of the impulse the circuit returns to a quiescent state until excited by another impulse. In the instant circuit, the grid 74 of tube VT7 is biased by a voltage divider formed by a resistor 75 and a potentiometer 76 so that tube VT7 is in a normally non-conducting condition, that is the grid is biased beyond cut-off. A control grid 77 of tube VT8 derives a bias potential normally through a resistor 78 and the tube is normally conducting. Upon the impression of a positive impulse of sufficient amplitude upon the grid 74, the tube VT7 becomes conducting. The potential of the anode 79 of tube VT7 then drops rapidly. This change is impressed upon the grid 77 of the tube VT8 through the coupling condenser 80 and that the tube becomes non-conducting so that the potential of the anode 81 increases sharply. This condition continues until such time as the coupling condenser 80 has discharged to an extent such that the grid to cathode potential of tube VT8 becomes less than the cut-off value, the time interval being determined by the time constant of the condenser 80, grid resistor 78, and anode coupling resistor 82. The potential of the anode 81 then returns to its normal value.

The series of positive impulses generated across the cathode resistor 73 of the clipper circuit are coupled to the control grid 74 of tube VT7 by a condenser 83 and a resistor 84. The values of the normal bias upon the grid 74, as determined by the potentiometer 76, then serves as a basis for distinguishing between the signal variations due to sheet material of satisfactory quality and those having imperfections. The amplitude of the positive impulses from the clipper will be greater in the latter case than in the former and by adjusting the potentiometer to a proper value of bias, the impulses of less amplitude will not cause the operation of the multivibrator while those of greater amplitude will cause the operation of the multivibrator and the generation of a gating impulse. Further, a continuous adjustment of what is acceptable and what is unacceptable material is provided.

The gating impulse generated at the anode 81 of tube VT8 is transmitted through a coupling circuit including a condenser 83 and a resistor 84 to a grid 85 of tube VT10 which is connected as a cathode follower. The time constant of the condenser 83 and the resistor 84 is relatively large and a diode rectifier tube VT9 is connected across the resistor to serve as a clipper and remove the negative impulse normally formed at the cessation of the gating impulse. The form of the successive gating impulses applied to the grid 85 will thus be exactly the same whatever their spacing or whatever the spacing of the impulses which are of sufficient amplitude to excite the multivibrator.

The cathode circuit of tube VT10 incorporates a relay 86, a resistor 87 and a condenser 88. Tube VT10 is biased by the resistor 87 to a level such that the normal cathode current does not actuate the relay, but so that the increase in current incident to the impression of the gating impulse upon the grid 85 actuates the relay and closes the contacts 89. The condenser 88 acts to prevent chattering of the relay when the gating impulses are spaced at small intervals.

The contacts 89 of the relay 86 are connected into a circuit including a relay 90 and a suitable source 91 of electrical energy. The contacts 92 of the relay 90 are then utilized to control the action of the diverter gate solenoid 21 through a time delay circuit 93. Suitable diverter gate control circuits and gate actuating means are well known in the art and the schematic representation utilized herein is merely illustrative.

The signal sections 46, 47, and 48 associated with the scanners 11, 12, and 13 are similar to the signal section 45 just described in detail. As shown in Fig. 5, these various signal sections are joined by parallel connection with diverter gate control relay 90 so that rejection of defective sheets may be had in response to signals from any of the four scanners. The utilization of such a plurality of scanners is dictated primarily by practical considerations. Separate scanners are, of course, required to inspect both sides of the sheet material. However, due to the fact that the light intensity attenuates rapidly in traveling from the source to the photo-electric cell, it is desirable that each scanner be of a moderate length. Two or more scanners may be used in multiple as described herein rather than a single very long scanner, as would be theoretically possible. The complications accompanying the use of very high intensity light sources and very high sensitivity photoelectric circuits is thus avoided while maintaining a relatively high ration between the intensity of the reflected beam and that of stray light from external sources.

It is to be understood that while the invention has been described in terms of the regular propagation of the inspection light beam by multiple reflection, diffused reflection or other non-regular propagation may be utilized within the spirit of the invention. Further, configuration of the scanner housing may be greatly modified from that shown herein.

The foregoing description is necessarily of a detailed character, in order that the specific embodiment of the invention may be completely set forth. It is to be understood that the specific terminology is not intended to be restrictive or confining and that various rearrangements of parts and modifications of detail may be resorted to without departing from the scope or spirit of the invention as herein claimed.

What is claimed is:

1. A scanner comprising a housing having a top wall incorporating an inner reflection surface, a partition normal to said top wall and extending along the length thereof, a first bottom wall along one side of said partition in spaced generally parallel relation with said top wall and incorporating a reflection surface on the inner side thereof, a second similar bottom wall positioned along the other side of said partition and having an opening along the length thereof, a photo-sensitive device mounted on each side of said partition in a first end of said housing, and means at the second end of said housing for forming reflectively propagating beams of light on either side of the said partition, each beam encompassing contiguous reflection areas.

2. The invention in accordance with claim 1, said last named means comprising equal openings in the said top wall on either side of the partition, a source of light, and means for directing light from said source through said openings.

3. The invention in accordance with claim 1, said last named means comprising equal openings in the top wall adjacent and on either side of said partition, a source of light, and means for directing equal amounts of light through said openings at an angle related to the length of the said openings and the spacing of the said reflection surfaces.

4. A scanner comprising a housing having a top wall incorporating a reflection surface on the inner side thereof, a bottom wall in said housing in spaced, generally parallel, relation to said top wall and incorporating a reflection surface on the inner side thereof, at least a portion of the said bottom wall having an opening along the length thereof to enable successive reflections from the surface of an object positioned outside the housing and adjacent the opening, a photo-sensitive device mounted in a first end of said housing and means at the second end of said housing for forming a reflectively propagated beam of light traveling between the top wall and the object to the photosensitive device, the beam encompassing contiguous reflection areas on the said bottom wall and the surface of said object.

5. The invention in accordance with claim 4, said last named means comprising an opening in the said top wall, a source of light, and means for directing light from said source through said opening.

6. The invention in accordance with claim 4, said last named means comprising an opening in the said top wall, a source of light, and means for directing light from said source through said opening at an angle related to the length of the opening and the spacing of the said reflection surfaces.

7. A scanner comprising a housing, having top and bottom walls in spaced, parallel relationship, at least one of the said walls having an opening therethrough for transmitting light to and from an article positioned outside the housing, reflectors mounted on the inner side of said walls and coincident therewith, a source of light mounted on one end of said housing, means for directing light from said source into a beam having a multiple reflection path between the reflectors and between the article and the remaining one of the said walls from the source end of the housing to the remaining end, a photosensitive device mounted at the remaining end of said housing, and means for directing the light transmitted to that end of the housing upon the photosensitive device.

8. A scanner comprising a housing having top and bottom walls in spaced parallel relationship, at least one of said walls having an opening therethrough for transmitting light to an object and for receiving light reflected from the object, reflectors mounted on the inner side of said walls and coincident therewith, a source of light mounted at one end of said housing, means for directing light from said source into a beam at an angle to the reflectors such that the successive reflection areas encompassed on each reflector are contiguous one to another as the light travels from the source end of the housing to the remaining end, a photo-sensitive device mounted at the remaining end of said housing, and means for directing the reflected light beam upon the device.

9. A scanner comprising a housing having top and bottom walls in spaced relationship, the inner sides of said walls forming reflection surfaces and the bottom wall incorporating an opening therein, and the top wall incorporating an opening at first end thereof, means for forming a beam of light directed through said opening in said top wall, the direction of the beam of light, the width of the opening in the top wall and the spacing between the walls being so related that the beam of light forms contiguous reflection areas on bodies positioned adjacent said opening in said lower wall and travels from the light means end of the housing to the remaining end, a photosensitive device mounted at the remaining end of said housing and means for directing the reflected light beam upon the device.

10. A scanner comprising a housing having top and bottom walls in spaced relationship, one of the walls having an elongated opening for transmitting light to and from an article adjacent the opening and a reflecting surface on the inner side of the remaining one of the walls for reflecting light received from the article, a source of light at one end of the housing, means for directing light from said source against the said reflecting surface of the remaining wall and the surface of the article so that the light travels from one end of the housing to the other by successive reflections from each of those surfaces, and a photosensitive device mounted at the remaining end of the housing for receiving the light after it has traversed the portion of the article adjacent the opening in the wall of the housing.

11. A scanner comprising a housing having top and bottom walls in spaced relationship, one of the walls having an elongated opening for transmitting light to and from an article adjacent the opening and a reflecting surface on the inner side of the remaining one of the walls for reflecting light received from the article, a source of light at one end of the housing, means for directing light from said source against the reflecting surface of the said remaining wall and the surface of the article so that the light travels from one end of the housing to the other by successive reflections from contiguous areas of each of those surfaces, and a photosensitive device mounted at the remaining end of the housing for receiving the light after it has traversed the entire portion of the article adjacent the opening in the wall of the housing.

12. Apparatus for inspecting sheet material comprising a conveyor for the material to be inspected, a light source at one side of the conveyor and a photosensitive device at the remaining side of the conveyor and means comprising a housing having the light source at one end thereof and the photosensitive device at the remaining end thereof and having an inner reflecting wall for propagating light from the said source to the said photosensitive device along a path in which the light is successively reflected from adjacent areas on the outer surface of the material whereby the light is cumulatively modified by the imperfections of a strip extending transversely across the sheet material and the photosensitive device generates signals which correspond to the imperfections of the sheet material conveyed between the light source and the photosensitive device.

13. Apparatus for inspecting sheet material comprising a conveyor for the material to be inspected, a light source at one side of the conveyor and a photosensitive device at the remaining side of the conveyor and means comprising a housing having the light source at one end thereof and the photosensitive device at the remaining end thereof and having an inner reflecting wall for propagating light from the said source to the said photosensitive device along a path in which the light is successively reflected from adjacent areas on the outer surface of the material whereby the light is cumulatively modified by the imperfections of a strip extending transversely across the sheet material and the photosensitive device generates signals which correspond to the imperfections of the sheet material conveyed between the light source and the photosensitive device, and a second similar photosensitive device, and means comprising a housing having the source at one end thereof and the second photosensitive device at the remaining end thereof and having two reflecting walls for reflectively propagating light from the source to the said second photosensitive device along a path substantially equal in length to that of the path to the first photosensitive device, and thereby provide a reference signal for the signals from the first photosensitive device.

14. Apparatus for inspecting sheet material comprising a conveyor for the material to be inspected, a scanner housing mounted adjacent the path of the material on said conveyor and comprising two portions having top and bottom walls in spaced relationship and one of the bottom walls having an elongated opening extending transversely across the path of the sheet material and the remaining said walls having reflecting surfaces on the inner sides thereof, a source of light at one end of the housing and means for directing light from the said source along a path extending between the sheet material adjacent the opening and the inner surface of the top wall associated therewith, so that the light travels to the remaining end of the housing by successive reflections from contiguous areas of the sheet material, and a first photosensitive device mounted at the remaining end of the housing for receiving the light after it has traversed the surface of the sheet material, means for directing the light from the source along a path of multiple reflection between the remaining top and bottom walls corresponding to that between the sheet material and the first top wall and a second photosensitive device mounted at the remaining end of the housing for receiving the light which has traversed the remaining top and bottom walls of the housing, whereby the said photosensitive devices generate signals which provide an exact representation of the imperfections across the strip and which change with the longitudinal movement of the sheet material.

References Cited in the file of this patent

UNITED STATES PATENTS

| | | |
|---|---|---|
| 1,294,741 | Winkley | Feb. 18, 1919 |
| 1,848,874 | Fitzgerald | Mar. 8, 1932 |
| 1,887,209 | Lucus | Nov. 8, 1932 |
| 1,940,882 | Rich | Dec. 26, 1933 |
| 1,946,681 | Frappier | Feb. 13, 1934 |
| 1,979,722 | Zworykin | Nov. 6, 1934 |

(Other references on following page)

UNITED STATES PATENTS

| | | | |
|---|---|---|---|
| 2,008,410 | Wilson | July 16, | 1935 |
| 2,140,355 | Gulliksen | Dec. 13, | 1938 |
| 2,183,606 | Day | Dec. 19, | 1939 |
| 2,202,060 | Mitchell | May 28, | 1940 |
| 2,222,429 | Briebrecher | Nov. 19, | 1940 |
| 2,229,638 | Chamberlain | Jan. 28, | 1941 |
| 2,231,621 | Goodridge | Feb. 11, | 1941 |
| 2,294,375 | Belar | Sept. 1, | 1942 |
| 2,417,092 | Smith | Mar. 11, | 1947 |
| 2,520,324 | Mirfield | Aug. 29, | 1950 |